United States Patent Office 3,637,779
Patented Jan. 25, 1972

3,637,779
PREPARATION OF BETA-SILATHIURONIUM SALTS
Gary E. Le Grow, Midland, Mich., assignor to Dow Corning Corporation, Midland, Mich.
No Drawing. Filed Apr. 23, 1970, Ser. No. 31,349
Int. Cl. C07f 7/02, 7/04
U.S. Cl. 260—448.2 E                                  3 Claims

ABSTRACT OF THE DISCLOSURE

Isothiuronium salts in which the sulfur is beta to silicon having the formula $$X^{-+}(NY_2)_2CSCHR''CH_2SiR_n(OR')_m$$

are prepared by reacting beta-halo compounds of the formula $XCHR''CH_2SiR_n(OR')_m$ with thiourea or methyl thiourea in the absence of a polar solvent. For example, beta-chloroethylmethyldimethoxysilane is reacted with thiourea in the absence of a solvent at 105° C. for 3 hours to give the corresponding isothiuronium salt of the silane.

---

It is shown in U.S. Pat. 3,215,718 that isothiuronium salts can be prepared by reacting haloalkyl silicon compounds having the structure $X(CH_2)_nSi$ with thiourea in the presence of solvents such as alcohols and ketones. However, the patent explicitly states that $n$ must have the value of at least 3. Also, it is shown in U.S. Pat. 3,314,982 that isothiuronium salts can be prepared by reacting haloalkyl silanes of the structure XMSi with thiourea in the presence of solvents such as ethanol and "liquids being highly polar, e.g. dimethylformamide," col. 2, line 6. This patent also states that M must have at least 3 carbon atoms. It is quite apparent that both patentees concluded that the reaction could not be carried out with haloalkylsilanes in which the halogen atom was alpha- or beta- to the silicon. The reason for this is that it is notoriously well known in the prior art that alpha, and particularly beta-haloalkylsilanes are particularly susceptible to attack by nucleophilic reagents. This is brought out by Eaborn, "Organosilicon Compound," pages 133 and 134, that beta elimination occurs when beta-chloro organosilicon compounds are exposed to alkali. Eaborn also states that the beta-halo compounds are even more susceptible to cleavage than the corresponding alpha-halosilanes or siloxanes. The susceptibility to nucleophilic attack is further elucidated in British Pat. 1,102,251, page 2, last paragraph, which states "For example, all these silanes, except those in which the HS group is attached to silicon through the beta-carbon atom of the divalent hydrocarbon moiety (R), can be formed by the reaction of NaSH with a chlorinated precursor of the formula $$(ClR)_aSi(OR')_{4(a+b)}^{R'_b}$$

Because of the relative instability of betachloroethylsilanes and similar silanes containing chlorine beta to the silicon atom, preparation of the corresponding mercapto analogue by reaction with NaSH is not considered feasible." These teachings in the art clearly indicate why the two patentees above shied away from attempts to prepare isothiuronium salts from haloalkylsilanes in which the halogen was beta to the silicon.

Applicant has found, however, most unexpectedly, that isothiuronium salts can be prepared from beta-haloalkylsilanes in excellent yield when the reaction is carried out in accordance with this invention.

This invention relates to the process of preparing beta-isothiuronium salts which comprises reacting a beta-halo organosilicon compound of the formula $$XCHR''CH_2SiR_n(OR')_m$$

with thiourea or N-methylthioureas in the absence of a polar solvent at a temperature sufficient to give an isothiuronium salt of the formula $$X^{-+}(NY_2)_2CSCHR''CH_2SiR_n(OR')_m$$

in both compounds X is chlorine or bromine, Y is hydrogen or methyl, R'' is hydrogen or a lower alkyl radical, R is a monovalent hydrocarbon radical free of aliphatic unsaturation, or a $R_fCH_2CH_2$— radical in which $R_f$ is a perfluoroalkyl radical, R' is a lower alkyl or lower alkoxyalkyl radical, $n$ is 0 to 2 and $m$ is 1 to 3, the sum of $n$ plus $m$ being not greater than 3.

R'' can be any lower alkyl radical such as methyl, ethyl or hexyl.

For the purpose of this invention R can be any monovalent hydrocarbon radical free of aliphatic unsaturation such as alkyl radicals such as methyl, ethyl, isopropyl, hexyl, octadecyl or myricyl; any cycloaliphatic radicals such as cyclopentyl, cyclohexyl or methylcyclohexyl; aryl hydrocarbon radicals such as phenyl, tolyl, xylyl, naphthyl, anthracyl or xenyl and aralkyl radicals such as benzyl, 2-phenylethyl- or 2-phenylpropyl. R' can also be $R_fCH_2CH_2$— in which $R_f$ is a perfluoroalkyl radical such as perfluoromethyl, perfluoroethyl, perfluoroisobutyl, perfluorooctyl, perfluorooctadecyl.

R' can be any lower alkyl radical such as methyl, ethyl, isopropyl or hexyl; or any lower alkoxyalkyl radical such as 2-methoxyethoxy, 2-ethoxymethoxy, 2-methoxypropyl, 2-butoxethoxy or —$(OCH_2CH_2)_2OCH_3$. The R and R' groups on any one silicon can be the same or different.

The isothiuronium salts can be formed from thiourea, tetra-methyl thiourea or thioureas having both hydrogen and methyl groups attached to the nitrogen, e.g. N-methylthiourea or sym N,N-dimethylthiourea.

The reaction of this invention must be carried out in the absence of a polar solvent. The term "polar solvent" means a solvent which contains active hydrogen or a solvent having a dipole moment not greater than about $2.0 \times 10^{18}$ e.s.u.

Preferably, the reaction is carried out without a diluent, but if desired, monopolar solvents such as hydrocarbons such as hexane, cyclohexane, heptane, benzene and toluene can be used as well as ethers such as diethylether or dioxane and halohydrocarbons such as carbon tetrachloride or perchloroethylene.

The temperature of the reaction is not critical and temperatures in the range 80 to 150° C. are sufficient.

The isothiuronium salts prepared by the method of this invention can be used as intermediates in the preparation of the corresponding mercaptoethylsilanes as shown in applicant's copending application Ser. No. 31,348 entitled "Method of Preparing Mercaptoalkylalkoxysilanes" which is filed on an even date herewith, and which is hereby incorporated herein by reference. The isothiuronium salts of this invention are also useful per se as coupling agents between plastics such as polyolefins and glass.

The following examples are illustrative only and should not be construed as limiting the invention which is properly delineated in the appended claims.

EXAMPLE 1

A slurry of 30.4 g. of thiourea and 56.2 g. of 2-chloroethylmethyldimethoxysilane was heated at 105° C. for 1 hour at which point the thiourea began to take on a mushy appearance. An exothermic reaction occurred and cooling was maintained such that the reaction temperature did not exceed 112° C. When the heat of reaction subsided the temperature was maintained at 105° C. for 3 hours and then the product was diluted with 37.4 g. of methanol. The structure of the isothiuronium salt was determined by nuclear magnetic resonance spectrum. It had the formula $$Cl^{-+}(NH_2)_2CSCH_2CH_2Si(CH_3)(OCH_3)_2.$$

EXAMPLE 2

Equivalent results are obtained when beta-chloroethyltrimethoxysilane is substituted in the procedure of Example 1. The product has the formula $$Cl^{-+}(NH_2)_2CSCH_2CH_2Si(OCH_3)_3$$

EXAMPLE 3

The following isothiuronium salts are obtained when the following silanes are reacted with the following thioureas in accordance with the procedure of Example 1.

That which is claimed is:

1. A process of preparing beta-isothiuronium salts which comprises reacting $XCR''HCH_2SiR_n(OR')_m$ with thiourea or a N-methylthiourea in the absence of a polar solvent, at a temperature sufficient to give an isothiuronium salt of the formula $X^{-+}(NY_2)_2CSCR''HCH_2SiR_n(OR')_m$ in which compounds X is chlorine or bromine,
Y is hydrogen or methyl,
R'' is hydrogen or lower alkyl radical,
R is a monovalent hydrocarbon radical free of aliphatic unsaturation or a $R_fCH_2CH_2$— radical in which $R_f$ is prefluoroalkyl radical,
R' is a lower alkyl radical or a lower alkoxyalkyl radical,
$n$ is 0 to 2, and
$m$ is 1 to 3, the sum of
$n+m$ being not greater than 3.

2. The process in accordance with claim 1 in which the beta-haloorganosilicon compound is beta-chloroethylmethyldimethoxysilane.

3. The method in accordance with claim 1 in which the beta-haloorganosilicon compound is beta-chloroethyltrimethoxysilane.

| Silane | Thiourea | Salt |
|---|---|---|
| $BrCH_2CH_2Si(CH_3)_2(OC_2H_5)$ | $(NH_2)_2C=S$ | $Br^{-+}(NH_2)_2CSCH_2CH_2Si(CH_3)_2(OC_2H_5)$ |
| $ClCH_2CH_2SiC_6H_5(OCH_3)_2$ | $N(CH_3)_2C=S$ | $Cl^{-+}[N(CH_3)_2]_2CSCH_2CH_2SiC_6H_5(OCH_3)_2$ |
| $ClCH_2CH_2SiC_{18}H_{37}(OCH_2CH_2OCH_3)_2$ | $(NH_2)_2C=S$ | $Cl^{-+}(NH_2)_2CSCH_2CH_2SiC_{18}H_{37}(OCH_2CH_2OCH_3)_2$ |
| $ClCH_2CH_2SiC_6H_{11}(OC_6H_{13})_2$ | $(NH_2)_2C=S$ | $Cl^{-+}(NH_2)_2CSCH_2CH_2SiC_6H_{11}(OC_6H_{13})_2$ |
| $ClCH_2CH_2Si(CH_2CH_2C_6H_5)_2[(OCH_2CH_2)_2OC_2H_5]$ | do | $Cl^{-+}(NH_2)_2CSCH_2CH_2Si(CH_2CH_2C_6H_5)[(OCH_2CH_2)_2OC_2H_5]$ |
| $ClCC(CH_3)CH_2Si(CH_2CH_2CF_3)(OCH_3)_2$ | do | $Cl^{-+}(NH_2)_2CSCH(CH_3)CH_2Si(CH_2CH_2CF_3)(OCH_3)_2$ |
| $ClCH(C_2H_5)CH_2Si(C_6H_4CH_3)(OCH_3)_2$ | do | $Cl^{-+}(NH_2)_2CSCH(C_2H_5)CH_2Si(C_6H_4CH_3)(OCH_3)_2$ |
| $ClCH_2CH_2Si(C_6H_4C_6H_5)(OCH_3)_2$ | do | $Cl^{-+}(NH_2)_2CSCH_2CH_2Si(C_6H_4C_6H_5)(OCH_3)_2$ |

References Cited

UNITED STATES PATENTS 3,215,718  11/1965  Ryan _____ 260—448.2 E
3,314,982  4/1967  Koerner et al. ___ 260—448.2 N TOBIAS E. LEVOW, Primary Examiner W. F. A. BELLAMY, Assistant Examiner U.S. Cl. X.R.

260—448.8 R, 448.8 A, 448.2 N